(12) United States Patent
Linzer

(10) Patent No.: US 7,400,360 B2
(45) Date of Patent: Jul. 15, 2008

(54) DEVICE FOR SIMULTANEOUS DISPLAY OF VIDEO AT TWO RESOLUTIONS WITH DIFFERENT FRACTIONS OF ACTIVE REGIONS

(75) Inventor: Elliot N. Linzer, Suffern, NY (US)

(73) Assignee: LSI Corporation, Milpitas, CA (US)

( * ) Notice: Subject to any disclaimer, the term of this patent is extended or adjusted under 35 U.S.C. 154(b) by 481 days.

(21) Appl. No.: 10/667,911

(22) Filed: Sep. 22, 2003

(65) Prior Publication Data

US 2005/0062889 A1 Mar. 24, 2005

(51) Int. Cl.
*H04N 5/46* (2006.01)
*H04N 3/27* (2006.01)

(52) U.S. Cl. .................. 348/564; 348/581; 348/556; 348/554; 348/704; 382/298; 382/299

(58) Field of Classification Search .............. 348/554, 348/555, 556, 564, 565, 568, 704, 561, 581; 382/298, 299; 386/109, 112; 375/240.25; 708/174, 203, 204

See application file for complete search history.

(56) References Cited

U.S. PATENT DOCUMENTS

| | | | | |
|---|---|---|---|---|
| 4,954,882 A * | 9/1990 | Kamemoto | ................. | 348/564 |
| 5,109,279 A * | 4/1992 | Ando | ......................... | 348/564 |
| 5,270,813 A * | 12/1993 | Puri et al. | .............. | 375/240.15 |
| 5,504,535 A * | 4/1996 | Abe | ............................ | 348/565 |
| 5,598,222 A * | 1/1997 | Lane | ......................... | 348/568 |
| 5,635,985 A * | 6/1997 | Boyce et al. | ........... | 375/240.15 |
| 5,680,177 A * | 10/1997 | Abe | ............................ | 348/564 |
| 5,734,436 A * | 3/1998 | Abe et al. | .................... | 348/564 |
| 5,790,204 A * | 8/1998 | Yamaguchi | ................. | 348/564 |
| 5,828,421 A * | 10/1998 | Boyce et al. | ................ | 348/565 |
| 5,969,769 A * | 10/1999 | Hamadate | ................... | 348/568 |
| 5,973,748 A * | 10/1999 | Horiguchi et al. | .......... | 348/554 |
| 5,988,863 A * | 11/1999 | Demos | ...................... | 708/203 |
| 6,011,594 A * | 1/2000 | Takashima | ................. | 348/565 |
| 6,025,878 A * | 2/2000 | Boyce et al. | ........... | 375/240.16 |
| 6,157,414 A * | 12/2000 | Sakamoto | ................... | 348/581 |
| 6,256,045 B1 * | 7/2001 | Bae et al. | .................... | 348/445 |
| 6,477,705 B1 * | 11/2002 | Yuen et al. | ..................... | 725/41 |
| 6,553,072 B1 * | 4/2003 | Chiang et al. | .......... | 375/240.25 |
| 6,727,958 B1 * | 4/2004 | Shyu | .......................... | 348/581 |
| 6,791,624 B1 * | 9/2004 | Suga | .......................... | 348/588 |
| 6,859,236 B2 * | 2/2005 | Yui | ............................. | 348/584 |
| 6,876,396 B2 * | 4/2005 | Mizobuchi et al. | .......... | 348/564 |
| 6,927,801 B2 * | 8/2005 | Yugami et al. | .............. | 348/458 |
| 6,943,845 B2 * | 9/2005 | Mizutome et al. | .......... | 348/555 |
| 6,961,097 B2 * | 11/2005 | Yui | ............................. | 348/584 |
| 7,030,934 B2 * | 4/2006 | Shy et al. | .................... | 348/584 |
| 7,039,113 B2 * | 5/2006 | Soundararajan | ........ | 375/240.25 |
| 7,061,544 B1 * | 6/2006 | Nonomura et al. | .......... | 348/568 |
| 7,068,329 B1 * | 6/2006 | Dujmenovic et al. | ........ | 348/731 |

\* cited by examiner

*Primary Examiner*—David Ometz
*Assistant Examiner*—Jean W Désir
(74) *Attorney, Agent, or Firm*—Christopher P. Maiorana, P.C.

(57) ABSTRACT

An apparatus comprising a first circuit and a second circuit. The first circuit may be configured to generate a decoded video signal. The second circuit may be configured to generate (i) a first video output signal having a first resolution and (ii) a second video signal having a second video resolution in response to the decoded video signal.

25 Claims, 7 Drawing Sheets

200

202
INITIALIZE SCALING PARAMETERS BASED UPON PREDETERMINED CRITERIA OR USER INPUT

204
RETRIEVE DECODED VIDEO INFORMATION

206
SCALE VIDEO INFORMATION ACCORDING TO THE INITIALIZED SCALING PARAMETERS TO SIMULTANEOUSLY GENERATE A FIRST VIDEO OUTPUT HAVING A FIRST SCANNING RESOLUTION AND A SECOND VIDEO OUTPUT HAVING A SECOND SCANNING RESOLUTION

208
SIMULTANEOUSLY PRESENT THE FIRST VIDEO OUTPUT AND THE SECOND VIDEO OUTPUT

FIG. 8

DEVICE FOR SIMULTANEOUS DISPLAY OF VIDEO AT TWO RESOLUTIONS WITH DIFFERENT FRACTIONS OF ACTIVE REGIONS

FIELD OF THE INVENTION

The present invention relates to displaying video images generally and, more particularly, to a device for simultaneous display of video at two resolutions with different fractions of active regions.

BACKGROUND OF THE INVENTION

Conventional video displays (e.g., televisions, monitors, etc.) can include a cathode ray tube (CRT). CRT displays generally present a picture or video image via a raster created by horizontal and vertical scanning of an electron beam. Although the exact number of scans per second and the methods of scanning can vary, the basic scanning arrangement is almost universally implemented. The image on a CRT display is formed by fine lines that are generated by moving the electron beam rapidly from left to right and back to left, while simultaneously moving the electron beam gradually downward. When the electron beam reaches the bottom of the screen, the beam returns to the top of the screen. The left-to-right and downward motions occur with the electron beam controlled by picture or video information, while the right-to-left motion (e.g., horizontal retrace, or flyback) and the vertical motion (e.g., vertical retrace), are performed with the electron beam off (or blanked).

Referring to FIG. 1, a diagram illustrating an analog video signal 10 is shown. The analog video signal 10 has an active portion and an inactive portion. The active portion contains the picture information (or image) to be displayed (e.g., visible lines). The inactive portion generally does not contain any video information. The inactive portion generally includes synchronization and blanking information (e.g., horizontal and vertical) that allows the electron gun to perform the horizontal and vertical retraces. For example, the inactive portion of the analog video signal 10 has a vertical blanking period 12 (for each field in an interlaced image or frame in a non-interlaced image) and a horizontal blanking period 14 (for each field/frame line).

Referring to FIG. 2, a diagram illustrating a video image 20 is shown. The video image 20 has an active region (or area) 22. The remainder of the image 20 is an inactive region (or area). When a digital video signal is to be converted to an analog video signal, the digital signal generally comprises the entire picture to be presented, including the horizontal and vertical blanking intervals (i.e., the inactive area).

In conventional systems, a portion of the active region 22 of the video image 20 is overscan. The overscan portion allows the image 20 to fill the entire viewable area (e.g., on consumer monitors and televisions). The overscan portion can contain actual image data. However, the overscan portion generally falls outside the viewable area of the screen.

When a digital video decoder is connected to a video digital-to-analog converter (DAC), the signal exchanged between the two devices is a sampled version of the entire picture (i.e., luminance (Y) and chrominance (Cr and Cb) components interleaved) The sampling rate (i.e., samples/line) as well as the number of active and inactive lines typically conform to a predefined standard (e.g., NTSC, PAL, etc.) that allows for interoperability of various devices.

Standard scanning formats currently in use include standard-definition (SD) video signals (i.e., 480i, where i indicates a frame comprises two interlaced fields) and high-definition (HD) video signals (i.e., 1080i and 720p, where p indicates a progressive scan or non-interlaced image). The number of high-definition television (HDTV) sets is growing. However, a large installed base of standard definition (SD) equipment is still available.

It would be desirable to have an apparatus and/or method for simultaneous display of video at two resolutions with different fractions of active regions.

SUMMARY OF THE INVENTION

The present invention concerns an apparatus comprising a first circuit and a second circuit. The first circuit may be configured to present a decoded video signal. The second circuit may be configured to generate (i) a first video output signal having a first resolution and (ii) a second video signal having a second video resolution in response to the decoded video signal.

The objects, features and advantages of the present invention include providing an apparatus and/or method for simultaneously displaying video at two resolutions with different fractions of active regions that may (i) simultaneously display both standard resolution and high resolution video images, (ii) scale video data to balance resolution and visible picture area, (iii) generate two video output resolutions from a single video input, (iv) allow user control of video scaling and/or (v) read video data once while simultaneously scaling the video data for two resolutions.

BRIEF DESCRIPTION OF THE DRAWINGS

These and other objects, features and advantages of the present invention will be apparent from the following detailed description and the appended claims and drawings in which:

FIG. 8 is a flow diagram illustrating a scaling process in accordance with a preferred embodiment of the present invention.

DETAILED DESCRIPTION OF THE PREFERRED EMBODIMENTS

Figure 1:
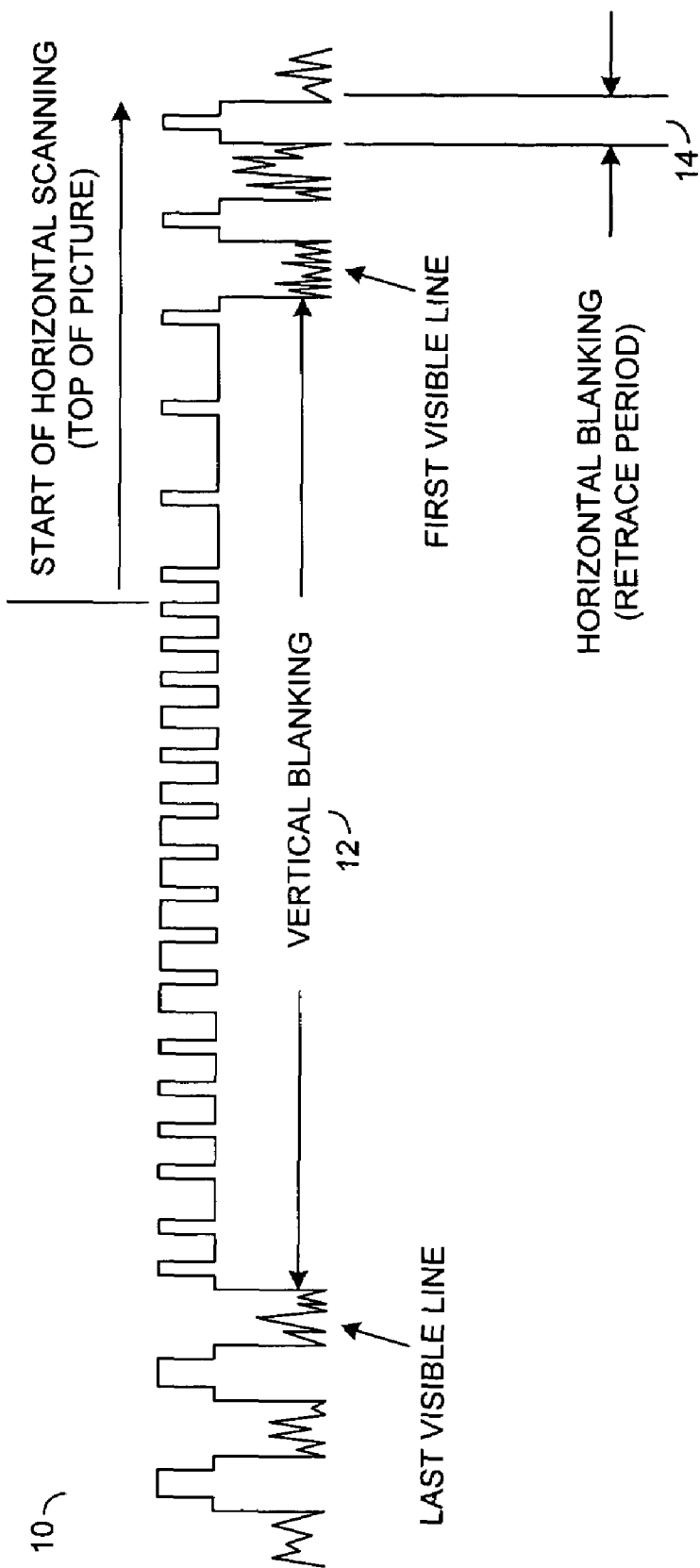
FIG. 1 is a diagram illustrating an analog video signal.
Figure 2:
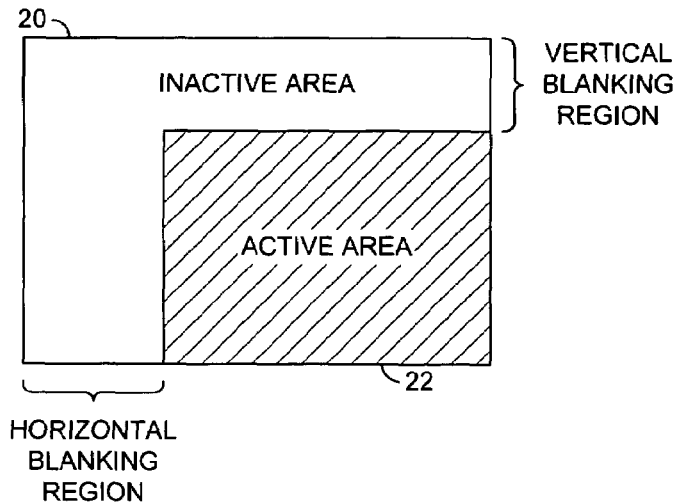
FIG. 2 is a diagram illustrating active and inactive portions of a video image.
Figure 3:
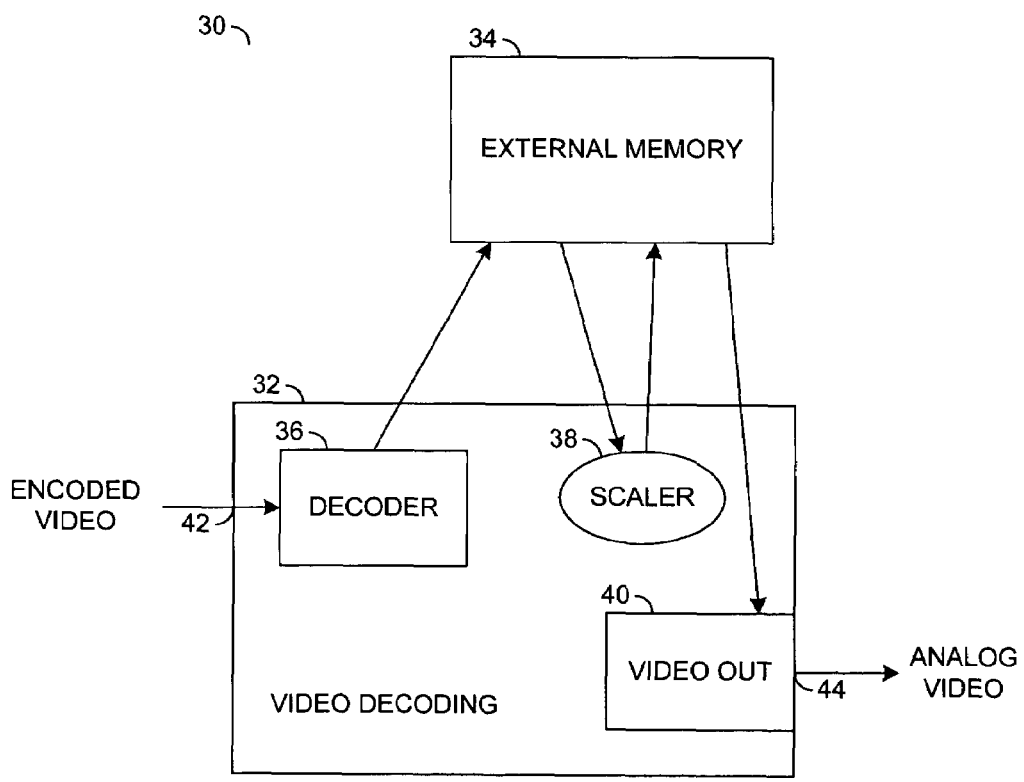
FIG. 3 is a diagram of a video decoding device.

Referring to FIG. 3, a block diagram of a video decoding device 30 is shown. The device 30 may comprise a video decoding block 32 and a memory 34. The decoding block 32 may comprise a decoder circuit 36, a scaler circuit 38 and a video output circuit 40. An encoded video signal is generally presented to an input 42 of the video decoding block 32. After the encoded video is decoded, the decoded video may be stored in the memory 34. Each picture (e.g., video information) is generally read from the memory 34 by the scaler circuit 38. The scaler circuit 38 is generally configured to scale the video information read from the memory 34 and store the scaled video information back to the memory 34. The scaled video information is generally read from the memory 34 by the video output circuit 40 and presented as an analog video signal at an output 44 of the video output circuit 40.

The memory 34 may be implemented externally from the decoding block 32. The memory 34 may be implemented, in one example, as random access memory (RAM). However, other types of storage devices may be implemented accordingly to meet the design criteria of a particular application.

Figure 4:
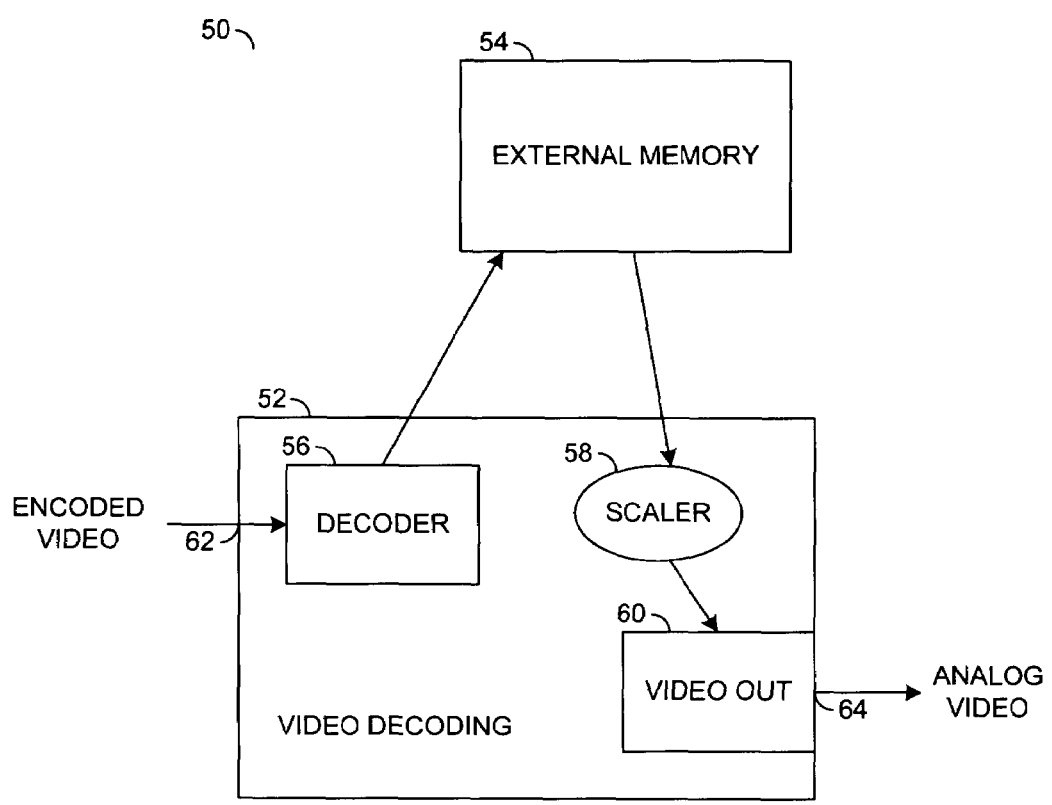
FIG. 4 is a block diagram of another video decoding device.

Referring to FIG. 4, a block diagram of a video decoding device 50 is shown. The device 50 generally comprises a decoding block 52 and a memory 54. The decoding block 52 generally comprises a decoder circuit 56, a scaler circuit 58 and a video output circuit 60. An encoded video signal is generally presented to an input 62 of the video decoding block 52. After the encoded video is decoded, the decoded video may be stored in the memory 54. Each picture (e.g., video information) may be read from the memory 54 by the scaler circuit 58. The scaler circuit 58 may be configured to scale the video information read from the memory 54 and present the scaled video information directly to the video output circuit 60. The video output circuit 60 may be configured to present the scaled video information as an analog video signal at an output 64.

The memory 54 may be implemented externally to the decoding block 52. The memory 54 may be implemented, in one example, as random access memory (RAM). However, other types of storage devices may be implemented accordingly to meet the design criteria of a particular application. In general, the circuit 50 is configured such that the data may transfer directly from the scaler circuit 58 to the video output circuit 60 without being stored back to the memory 54. The circuit 50 is generally more efficient than the circuit 30, in that less space in the external memory 54 is used and less bandwidth is used for scaling and display.

The decoder circuits 32 and 52 may be configured to decode an encoded video stream that approximately comprises the active area to be displayed. In one example, the encoded video stream may have a resolution different from the display (or "scanning") resolution. For example, two standard scanning formats are generally summarized in the following TABLE 1:

TABLE 1

| Name | Active samples/ line | Total samples/ line | Active lines/ frame | Total lines/ frame |
|---|---|---|---|---|
| ANSI/SMPTE 293M-1996 (480i) (standard definition or SD) | 720 | 868 | 483 | 535 |
| ANSI/SMPTE 274M-1995/2 (1080i) (high definition of HD) | 1920 | 2200 | 1080 | 1125 |

The encoded images may have a resolution different from the scanning resolution because (a) a few samples on either side of the active area are not sent and/or (b) the image is simply encoded at a scaled resolution. For example, a video bit stream may be encoded at a resolution of 1920×1080 (e.g., corresponding exactly to the 1080i scanning standard). The encoded bit stream may be decoded and presented as a 1080i stream without modification. In another example, a video bit stream may be encoded at a resolution of 720×480 (e.g., approximately corresponding to the 480i scanning standard). The encoded bit stream may be presented as a 480i stream by the addition of three lines with black or some other solid color.

In general, the decoding circuits 30 and 50 may be configured to generate video streams with standard scanning resolutions in response to encoded bit streams having a variety of resolutions. For example, a video bit stream encoded at a resolution of 704×480 may be presented as a 480i stream by the addition of three lines and sixteen columns with black or some other solid color; a video bit stream encoded at a resolution of 480×480 may be presented as a 480i stream by up-sampling the bit stream horizontally to 720 pixels (e.g., a 2:3 up-sample) and by adding three lines with black or some other solid color; a video bit stream encoded at a resolution of 720×480 may be presented as a 1080i stream by up-sampling vertically by a ratio equal to 1080/483 and horizontally by a ratio equal to 1920/720. Missing lines (because the video is up-sampled by a ratio of 1080/483, 1080 lines are needed, but only 480 lines were present at the start) may be filled in with black or some other solid color.

The circuit 30 may be configured to generate both SD and HD outputs. However, because the scaled data is read from the memory 34, implementation of two or more outputs with different resolutions generally increases the size of the memory 34. The circuit 50 may be configured to generate both SD and HD outputs, but only if the video is read separately for each resolution (SD and HD). The reason is that, as can be determined from TABLE 1, the fraction of the picture that is active vertically is 92% for 480i (e.g., 483/525) scanning format but 96% for 1080i (e.g., 1080/1125) scanning format. Because 1080i and 480i video have the same frame rate, active data is needed "faster" for the SD output than for the HD output. For example, for a frame rate of 30/1.001 frames/second, the active region of a 480i field takes 483/525/ 2/(30/1.001) seconds (about 15.34 ms), but the active region of the HD field takes 1080/1125/2/(30/1.001) seconds (about 16.02 ms).

Figure 5:
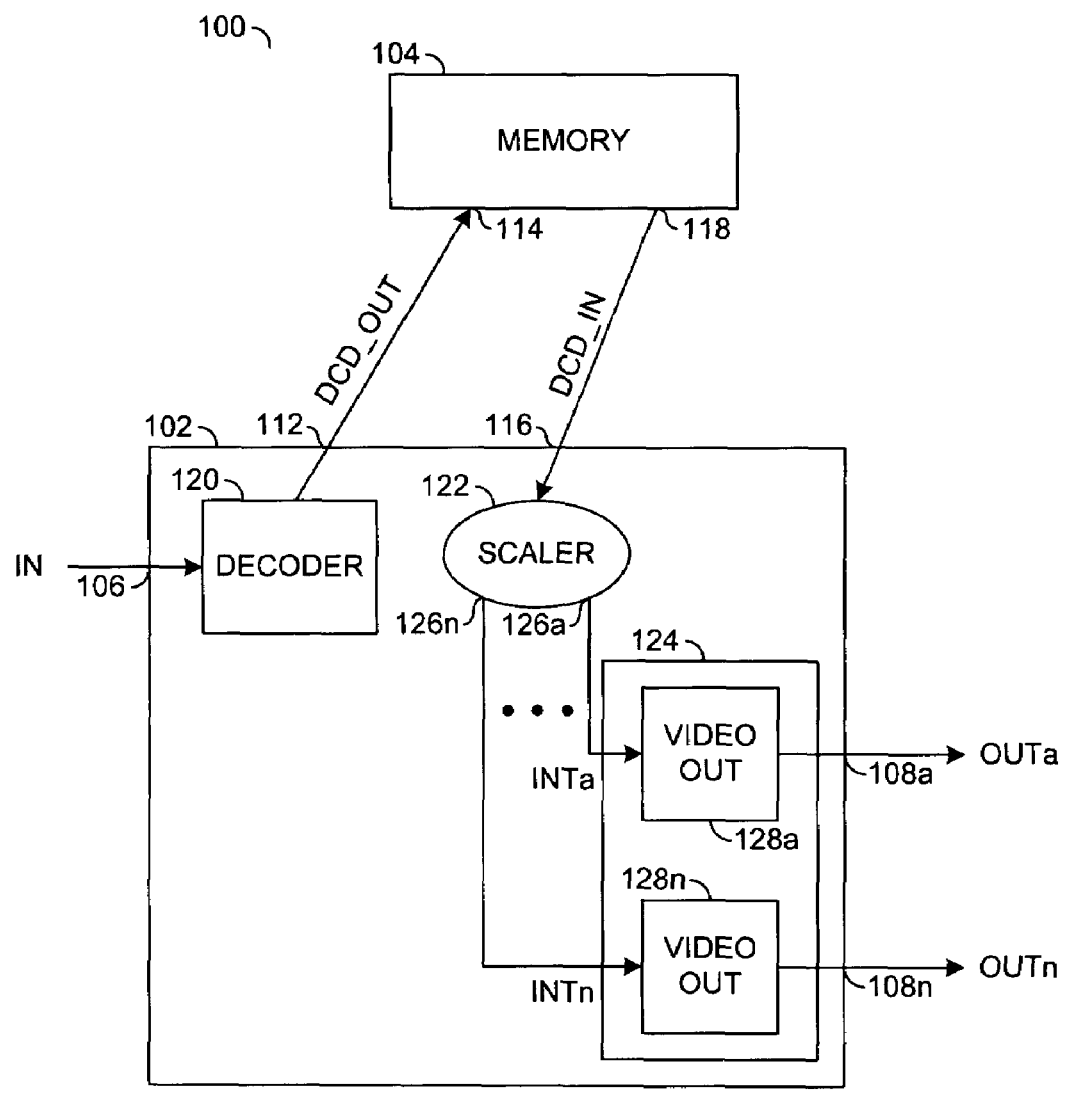
FIG. 5 is a block diagram of a video decoding device in accordance with a preferred embodiment of the present invention.

Referring to FIG. 5, a block diagram of a circuit 100 is shown illustrating a video decoder in accordance with a preferred embodiment of the present invention. The circuit 100 may be configured to generate both SD and HD outputs from a single read. The circuit 100 may comprise a decoding portion 102 and a memory portion 104. In one example, the memory portion 104 may be implemented as an external memory with respect to the decoding portion 102. The decoding portion 102 may have an input 106 that may receive a signal (e.g., IN) and a number of outputs 108a-108n that may present a number of signals (e.g., OUTa-OUTn). In one example, the circuit decoding portion 102 may be implemented with two outputs (e.g., a SD output and a HD output). The signal IN may be implemented as an encoded video signal. The signals OUTa-OUTn may be implemented, in one example, as analog or digital video signals. Each of the signals OUTa-OUTn may be implemented with a different resolution and/or fraction of active region. In one example, one of the signals OUTa-OUTn (e.g., OUTa) may comprise a standard definition (SD) video signal and another of the signals OUTa-OUTn (e.g., OUTn) may comprise a high definition (HD) video signal. The images represented by the signals OUTa-OUTn may have different active areas. For example, a DVD player including the circuit 100 may play a disk (encoded at whatever resolution) such that both a SD output and a HD output simultaneously show the video at the correct resolution after scaling.

When the memory 104 is implemented as an external memory, the circuit 102 may further comprise an output 112 that may present a signal (e.g., DCD_OUT) to an input 114 of the memory 104 and an input 116 that may receive a signal (e.g., DCD_IN) from an output 118 of the memory 104. The signals DCD_OUT and DCD_IN may, in one example, comprise digital video signals. In one example, the memory 104 may be implemented as an image buffer of a video decoding apparatus. The circuit 100 may be implemented as part of a set top box, a DVD player, or any other video device.

The circuit 102 may comprise a circuit 120, a circuit 122 and a circuit 124. The circuit 120 may be implemented as a decoder circuit. The circuit 122 may be implemented as a scaler circuit. The circuit 124 may be implemented as a video generator circuit. The circuit 120 may have an input that may receive the signal IN and an output that may present the signal DCD_OUT. The circuit 120 may be configured to generate the signal DCD_OUT in response to the signal IN. The circuit 120 may be compliant with one or more encoding standards (e.g., MPEG-2, MPEG-4, H.264, etc.).

The circuit 122 may be configured to receive the signal DCD_IN. The circuit 122 may have a number of outputs 126a-126n that may present a number of intermediate signals (e.g., INTa-INTn). Each of the signals INTa-INTn may be presented to a corresponding input of the circuit 124. The circuit 124 may be configured to generate the signals OUTa-OUTn in response to the signals INTa-INTn. In one example, the circuit 124 may comprise a number of circuits 128a-128n. Each of the circuits 128a-128n may be configured to generate one of the signals OUTa-OUTn in response to one of the signals INTa-INTn, respectively. In one example, the circuits 128a-128n may comprise video digital-to-analog converters.

The signal IN is generally decoded and stored to the memory 104. The decoded video may be read in from the memory 104, scaled for two resolutions (e.g., SD and HD) and displayed in two resolutions. The video data may be scaled in response to predetermined parameters such that each output is generally fed at about the same rate. However, when the video outputs have different fractions of active display, either one output displays as a shrunken picture or one output displays as an expanded picture.

For example, a video frame stored with 1080 lines may be unscaled for output at the HD resolution and scaled by a ratio of 525/1125=7/15 for output at the SD resolution. The scaling of the video frame for output at the SD resolution generally produces 1080*7/15=504 lines. However, only 483 lines may be placed in the active region of the SD output. Because the displayed image contains only 483 lines of the 504 lines, the image generally appears larger vertically. A substantially similar distortion is generally introduced horizontally, such that the picture is larger but has the correct aspect ratio. Because the picture is larger, less of the picture is generally visible (e.g., about 4% of the picture in each direction is generally not shown). However, the missing (or unshown) portion may not be very noticeable to a casual viewer.

In a second example, a video frame stored with 1080 lines may be scaled by a factor of 483/1080 to produce 483 lines for the output at the SD resolution, and by (483/1080)*(1125/525) to produce 1035 lines of active output at the HD resolution. The remaining 1080-1035=45 lines generally do not contain picture information (e.g., the lines may be filled with black or another solid color). When viewed on a consumer monitor or TV, the black is generally not visible; instead the viewer sees more of the picture than usual but the contents in the picture generally appear smaller.

In a third example, a video frame stored with 240 lines may be scaled by a ratio of 1080/240=9/2 for the output at the HD resolution and scaled by a ratio of 1080/240*525/1125=21/10 for the output at the SD resolution. Such scaling generally produces 1080 active lines for the HD output and 240*21/10=504 lines for the SD output. Because only 483 are generally available in the active region of the SD output, the SD image generally appears larger vertically. A substantially similar distortion is generally introduced horizontally, so that the picture is larger but has the correct aspect ratio. Because the picture is larger, less of the picture is generally visible. For example, about 4% of the picture (in each direction) is generally not shown. However, the missing portion of the picture is generally not very noticeable to a casual viewer.

In an example where two outputs are implemented, the range of scaling ratios may be expressed by the following equations, where L represents the number of lines in video to be scaled to resolutions 1 and 2; ACT_1 represents the number of active lines for video resolution 1; ACT_2 represents the number of active lines for video resolution 2; Tot_1 represents the number of total lines for video resolution 1; Tot_2 represents the number of total lines for video resolution 2; Sca_1 represents the factor by which video at resolution 1 is scaled; Sca_2 represents the factor by which video at resolution 2 is scaled.

In order to be able to read each picture once and scale the picture for both resolutions, the scaling factors are generally selected according to the following relationship:

$$Sca\_2/Sca\_1 = Tot\_2/Tot\_1.$$

The actual scaling ratios used may be determined according to different predetermined criteria. In a first embodiment, the scaling factors may be optimized for resolution 1. For example, the factor Sca_1 may be set such that the L lines are scaled to produce ACT_1 active lines for output 1. Such an optimization is generally summarized in the following equations:

$$Sca\_1 = ACT\_1/L;$$

$$Sca\_2 = ACT\_1/L * Tot\_2/Tot\_1.$$

In another embodiment, the factors may be optimized for resolution 2. For example, the factor Sca_2 may be selected such that the L lines are scaled to produce ACT_2 active lines for output 2. Such an optimization is generally summarized in the following equations:

$$Sca\_2 = ACT\_2/L;$$

$$Sca\_1 = ACT\_2/L * Tot\_1/Tot\_2.$$

In yet another embodiment, the factor Sca_1 may be chosen as a "compromise" solution (e.g., a number in between the value selected in the first embodiment and the value selected in the second embodiment). In general, a compromise solution balances the effect of scaling on the two outputs. For example, when a compromise solution is employed, the scaling for resolution 1 is generally worse when compared to the first embodiment but better when compared to the second embodiment. However, the scaling for resolution 2 is generally better when compared to the first embodiment but worse when compared to the second embodiment.

Figure 6:
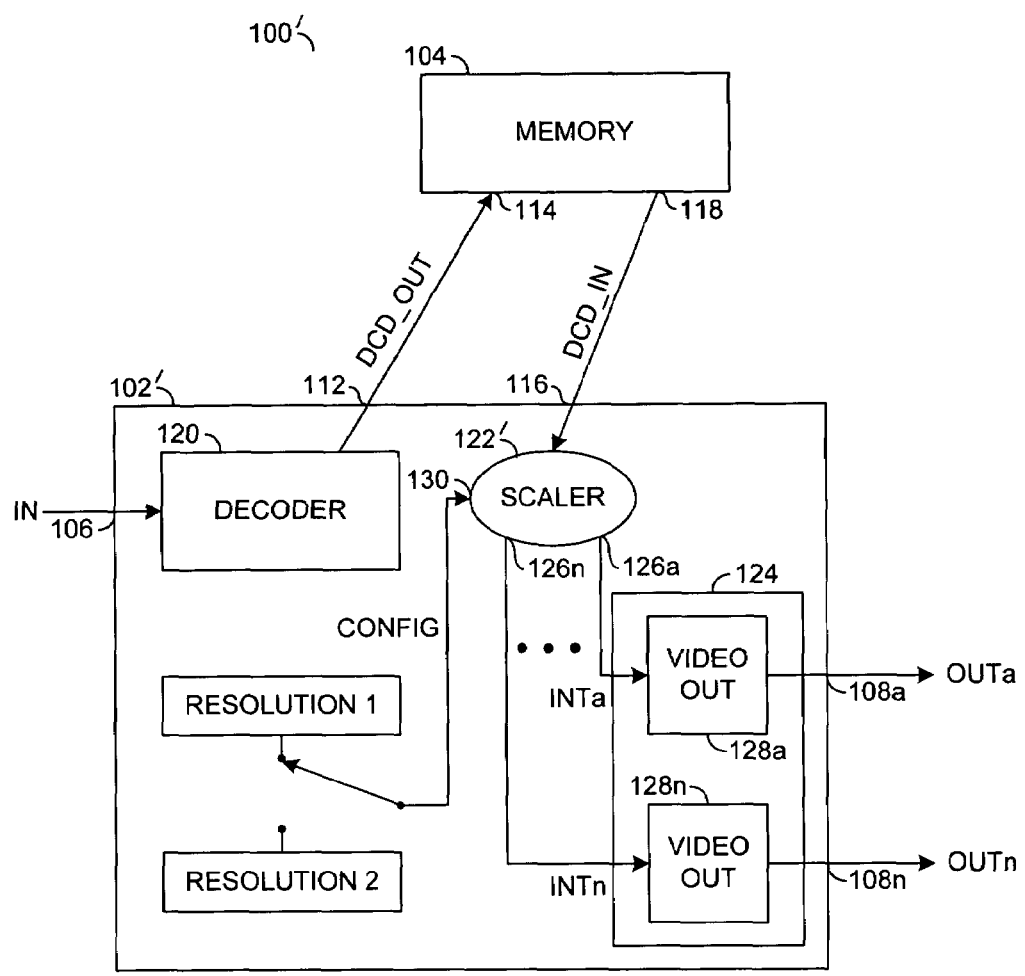
FIG. 6 is a block diagram of a video decoding device in accordance with another embodiment of the present invention.

Referring to FIG. 6, a block diagram of a circuit 100' is shown illustrating a video decoder implemented in accordance with an alternative embodiment of the present invention. In general, the video decoder 100' may be implemented similarly to the video decoder 100 of FIG. 5 except that the video decoder 100' may comprise a scaler circuit 122'. The scaler circuit 122' may further comprise an input 130 that may receive a signal (e.g., CONFIG) that may configure one or more scaling factors used when generating the signals INTa-INTn.

In one example, the signal CONFIG may be generated in response to strapping options on a circuit board, bond options, dip switch settings, values stored in a memory and/or a user input. In one example, the signal CONFIG may comprise a user programmable signal configured to select between predetermined scaling factors employed by the scaler circuit 122'. The scaling generally remains constrained by the relationship Sca_2/Sca_1=Tot_2/Tot_1. The constraint generally ensures that scaling for both resolutions 1 and 2 may occur with a single read from memory. In one example, the circuit 100' may be configured to allow the user (i) to optimize scaling for the resolution of output 1 or (ii) to optimize scaling for the resolution of output 2.

Figure 7:
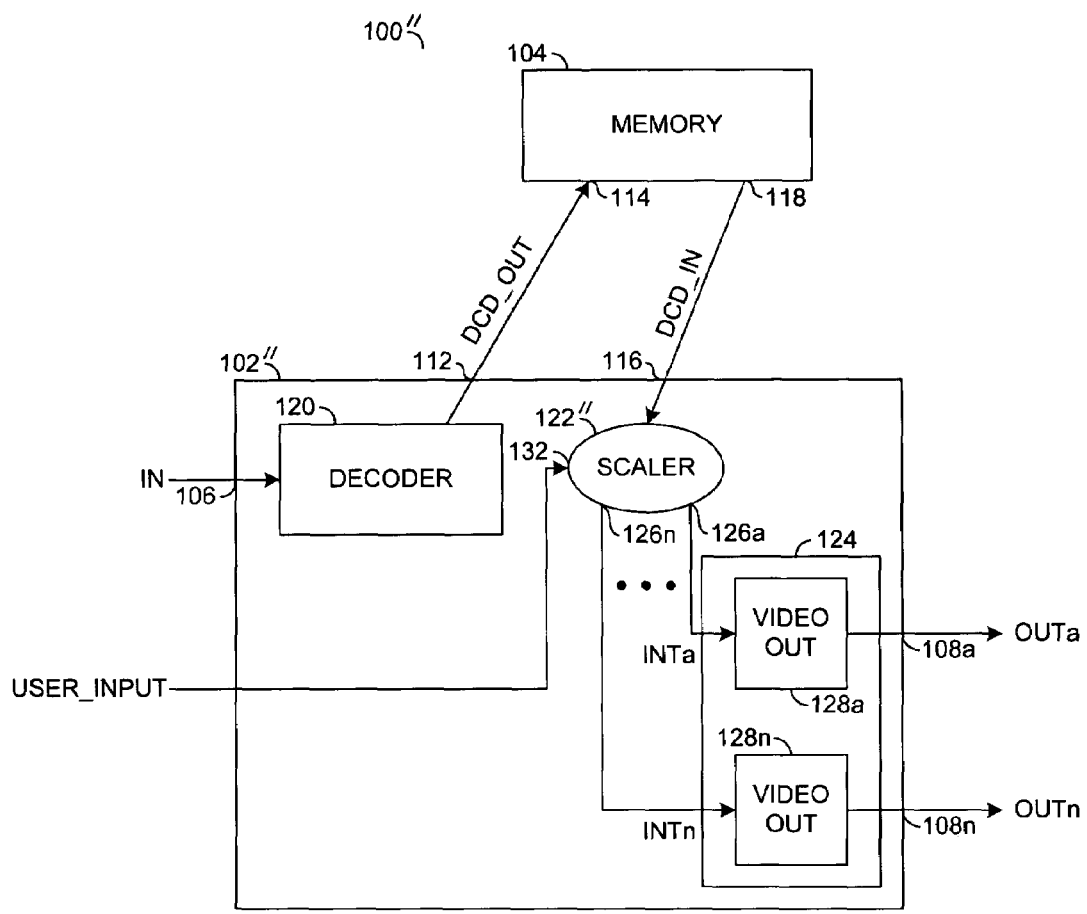
FIG. 7 is a block diagram of a video decoding device in accordance with still another embodiment of the present invention.

Referring to FIG. 7, a block diagram of a circuit 100" is shown illustrating a video decoder implemented in accordance with another alternative embodiment of the present invention. In general, the video decoder 100" may be implemented similarly to the video decoder 100' of FIG. 6 except that the video decoder 100" may comprise a scaler circuit 122". The scaler circuit 122" may further comprise an input 132 that may receive a signal (e.g., USER_INPUT) from an external source. The circuit 122" may configure one or more scaling factors used when generating the signals INTa-INTn in response to the signal USER_INPUT. In one example, the signal USER_INPUT may comprise one or more user programmable scaling factors employed by the scaler circuit 122".

Referring to FIG. 8, a flow diagram 200 is shown illustrating a scaling process in accordance with the present invention. The process 200 may begin by initializing a number of parameters for configuring and/or controlling the scaling process (e.g., the block 202). Video data may be retrieved from a storage device (e.g., the block 204) and scaled for a number of scaled video outputs according to the initialized parameters (e.g., the block 206). In general, a single read may be performed to generate a plurality of scaled video outputs. A number of analog video signals may be simultaneously generated in response to the plurality of scaled video outputs (e.g., the block 208).

The present invention may allow devices (such as digital set-top boxes and DVD players) to have both standard definition (SD) and high definition (HD) outputs (e.g., 480i and 1080i). Moreover, both of the outputs may be "live" at the same time. Although the present invention has been described using scanning resolutions of 480i and 1080i, the present invention is applied to other scanning resolutions as well. For example, the HD output may be configured to present a 720p compliant signal.

The function performed by the flow diagram of FIG. 8 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a decoder circuit configured to receive an encoded video signal at a first input and to present a decoded video signal at a first output; and
   a scaler circuit configured (a) to receive (i) said decoded video signal at a second input and (ii) a user input signal at a third input and (b) to present (i) a first video output signal having a first resolution at a second output and (ii) a second video output signal having a second resolution at a third output, wherein said first video output signal and said second video output signal are generated simultaneously by scaling said decoded video signal in response to said user input signal.

2. The apparatus according to claim 1, further comprising:
   a memory circuit configured to store said decoded video signal prior to presentation at said first output.

3. The apparatus according to claim 1, wherein said scaler circuit is further configured to generate a first intermediate signal and a second intermediate signal in response to said decoded video signal and said user input signal.

4. The apparatus according to claim 3, wherein said scaler circuit further comprises:
   a first video digital-to-analog converter circuit configured to generate said first video output signal in response to said first intermediate signal, wherein said first video output signal comprises an analog signal; and
   a second video digital-to-analog converter circuit configured to generate said second video output signal in response to said second intermediate signal.

5. The apparatus according to claim 1, wherein said first video output signal and said second video output signal have scales determined in response to said user input signal.

6. The apparatus according to claim 5, wherein said scales are predetermined to optimize said first resolution.

7. The apparatus according to claim 5, wherein said scales are predetermined to optimize said second resolution.

8. The apparatus according to claim 5, wherein said scales are predetermined to balance said first resolution and said second resolution.

9. The apparatus according to claim 5, wherein said scales are user-programmable.

10. The apparatus according to claim 9, wherein said scales are constrained according to a ratio of lines in said first video output signal and said second video output signal.

11. The apparatus according to claim 1, wherein said first video output signal and second video output signal comprise a standard definition video signal and a high definition video signal, respectively.

12. The apparatus according to claim 3, wherein said scaler circuit is configured to generate both said first intermediate signal and said second intermediate signal in response to a single reading of image data from a memory circuit.

13. An apparatus comprising:
- means for generating a decoded video signal in response to an encoded video signal, wherein said encoded video signal is received at a first input and said decoded video signal is presented at a first output; and
- means for simultaneously generating (i) a first video output signal having a first resolution and (ii) a second video output signal having a second resolution by scaling said decoded video signal in response to a user input signal received at a second input, wherein said first video output signal is presented at a second output and said second video output signal is presented at a third output.

14. A method for displaying video images comprising the steps of:
- (A) generating a decoded video signal in response to an encoded video signal, wherein said encoded video signal is received at a first input and said decoded video signal is presented at a first output;
- (B) simultaneously generating (i) a first video output signal having a first resolution and (ii) a second video output signal having a second resolution by scaling said decoded video signal in response to a user input signal received at a second input; and
- (C) presenting (i) said first video output signal at a second output and (ii) said second video output signal at a third output.

15. The method according to claim 14, wherein the step (A) comprises:
- decoding said encoded video signal; and
- storing said decoded video signal in a storage device.

16. The method according to claim 14, wherein the step (B) further comprises:
- generating a first intermediate signal in response to said decoded video signal and a first scaling factor; and
- generating a second intermediate signal in response to said decoded video signal and a second scaling factor, wherein (i) said first intermediate signal and said second intermediate signal are generated simultaneously and (ii) said first scaling factor and said second scaling factor are determined based upon said user input signal.

17. The method according to claim 16, wherein said first intermediate signal and said second intermediate signal are generated with a single read of image data from a storage device storing said decoded video signal.

18. The method according to claim 16, wherein the step (B) further comprises:
- generating said first video output signal using a digital-to-analog conversion on said first intermediate signal; and
- generating said second video output signal using a digital-to-analog conversion on said second intermediate signal.

19. The method according to claim 16, wherein said first scaling factor and said second scaling factor are different.

20. The method according to claim 16, wherein said first scaling factor and said second scaling factor are predetermined to optimize said first resolution.

21. The method according to claim 16, wherein said first scaling factor and said second scaling factor are predetermined to optimize said second resolution.

22. The method according to claim 16, wherein said first scaling factor and said second scaling factor are predetermined to balance said first resolution and said second resolution.

23. The method according to claim 16, wherein said first scaling factor and said second scaling factor are user-programmable.

24. The method according to claim 16, wherein said first scaling factor and said second scaling factor are constrained according to a ratio of lines in said first video output signal and said second video output signal.

25. The method according to claim 14, wherein (i) said first video output signal comprises a standard definition (SD) video signal, (ii) said second video output signal comprises a high definition (HD) video signal and (iii) said first video output signal and said second video output signal are presented simultaneously at said second output and said third output, respectively.

* * * * *